United States Patent [19]
Rijckaert et al.

[11] Patent Number: 5,448,368
[45] Date of Patent: Sep. 5, 1995

[54] ARRANGEMENT FOR RECORDING OR REPRODUCING DATA REDUCED VIDEO INFORMATION

[75] Inventors: Albert M. A. Rijckaert; Eric H. J. Persoon; Wilhelmus J. Van Gestel; Peter H. N. De With, all of Eindhoven, Netherlands

[73] Assignee: U.S. Philips Corporation, New York, N.Y.

[21] Appl. No.: 241,978

[22] Filed: May 12, 1994

[30] Foreign Application Priority Data

May 14, 1993 [EP] European Pat. Off. ............ 93201392

[51] Int. Cl.$^6$ ............................................. H04N 5/76
[52] U.S. Cl. ................................... 358/335; 358/342; 360/48
[58] Field of Search ............... 358/335, 342, 310; 360/32, 33.1, 48; 348/384, 398, 393

[56] References Cited

U.S. PATENT DOCUMENTS 5,068,774  11/1991  Ito ...................................... 358/310
5,148,272  9/1992  Acampora et al. ................... 348/384
5,239,308  8/1993  Keesen .................................. 341/67

FOREIGN PATENT DOCUMENTS 0492704  7/1992  European Pat. Off. .

OTHER PUBLICATIONS

"An Intraframe Feedforward Coding System", by P. de With et al, Proc. 12th Benelux Symposium on Information Theory, May 1991, pp. 63–69.
Gimlett, "Use of Activity Classes in Adaptive Transform Image coding", IEEE Transactions on Communications, Jul. 1976, pp. 785–786.

Primary Examiner—Howard W. Britton
Assistant Examiner—Robert Chevalier
Attorney, Agent, or Firm—Michael E. Marion

[57] ABSTRACT

Arrangements for recording and reproducing datareduced videoinformation are described. The recording arrangement comprises a datareduction unit (3) and a formatting unit (4). The formatting unit (4) generates packets ($P_i$) each having a first, second and third packet portion ($PP_1$, $PP_2$ and $PP_3$). The first packet portion comprises a sync word (SW) and an identification word. The second packet portion comprises datareduced videoinformation of a first and a second datablock ($MB_0$, $MB_1$). A datablock comprises DC coefficients ($DC_i$) and most significant and least significant AC coefficients ($MAC_i$, $LAC_i$). The videoinformation comprised in the first and the second datablock are stored in the second packet portion ($PP_2$), such that the DC coefficients of the first datablock ($DC_0$) are stored first, the plurality of most significant AC coefficients ($MAC_0$) of the first datablock are stored next, the DC coefficients of the second datablock ($DC_1$) are stored last in the second packet portion, and the plurality of most significant AC coefficients ($MAC_1$) of the second datablock are stored before the DC coefficients of the second datablock in the second packet portion. This enables an improved reproduction of the videosignal in a feature mode.

18 Claims, 9 Drawing Sheets

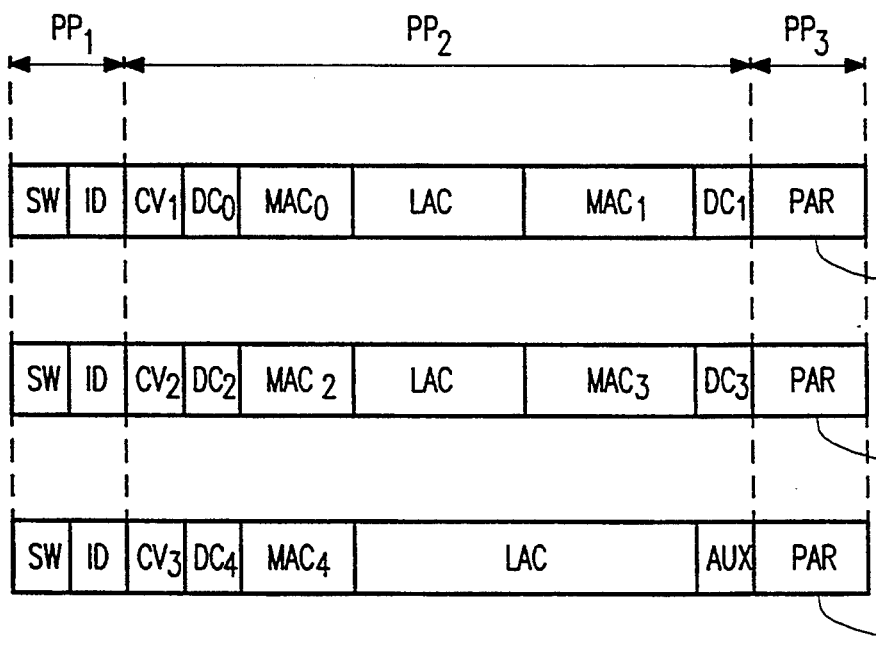
FIG. 4
FIG. 5a
FIG. 5b
FIG. 5c
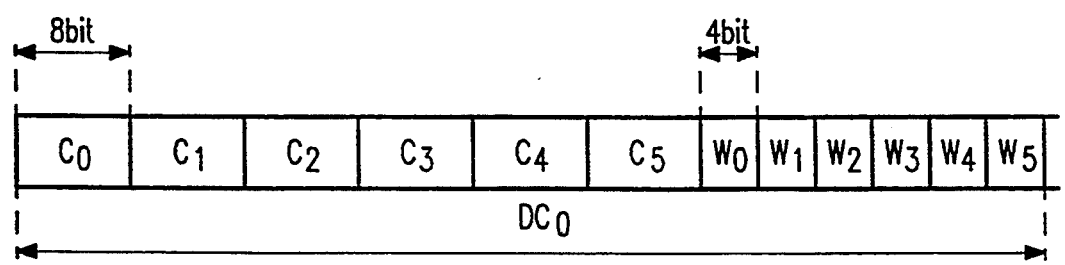
FIG. 6a
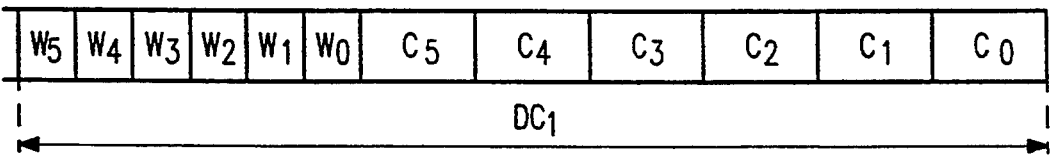
FIG. 6b

| 1 | 9 | 32 | 46 | 31 | 9 |
|---|---|----|----|----|---|
|CV$_1$|DC$_0$|AC$_0$| |AC$_1$|DC$_1$|

| 1 | 9 | 55 | 54 | 9 |
|---|---|----|----|---|
|CV$_2$|DC$_2$|AC$_2$|AC$_3$|DC$_3$|

| 1 | 9 | 59 | 53 | 6 |
|---|---|----|----|---|
|CV$_3$|DC$_4$|AC$_4$| |AUX|

| 1 | 9 | 112 | 6 |
|---|---|-----|---|
|CV$_3$|DC$_4$|AC$_4$|AUX|

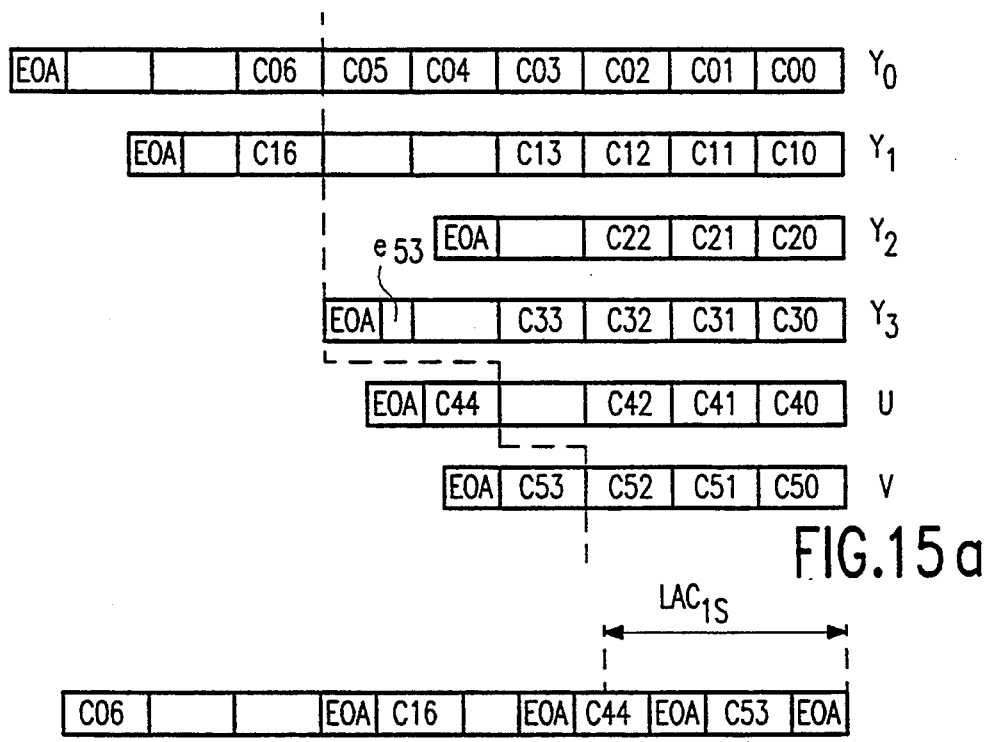
FIG.15a
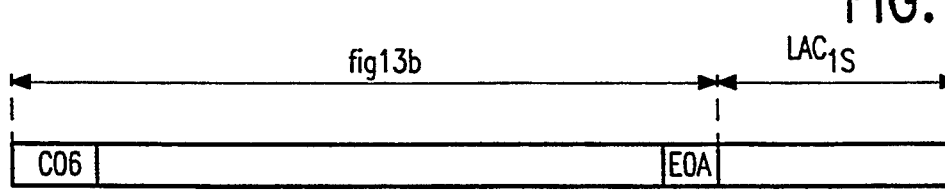
FIG.15b
FIG.15c
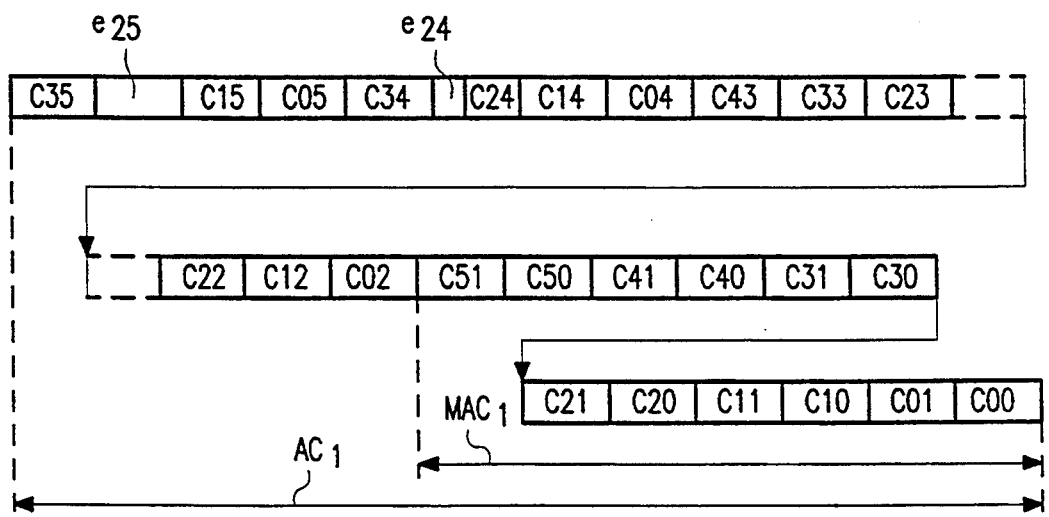
FIG.16

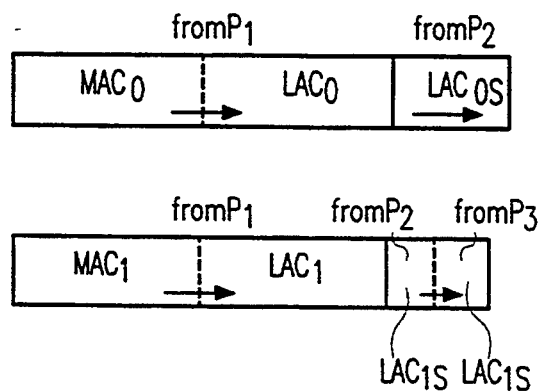
FIG.19
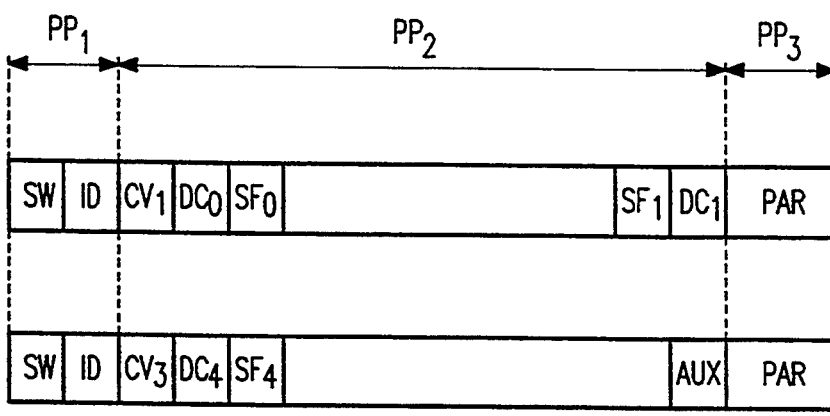
FIG.21a
FIG.21b
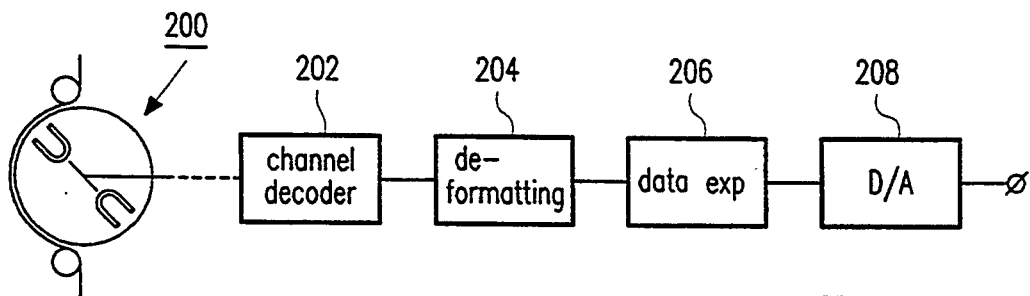
FIG.22

ARRANGEMENT FOR RECORDING OR REPRODUCING DATA REDUCED VIDEO INFORMATION

BACKGROUND OF THE INVENTION

The invention relates to an arrangement for recording, at a predetermined recording speed, a digital videosignal in a track on a record carrier, the recording arrangement comprising an input terminal for receiving the digital videosignal, data compression means for data reducing the digital videosignal so as to obtain data reduced videoinformation in the form of a plurality of datablocks, each datablock defining a subpicture of a plurality of subpictures in which a picture is divided, a datablock comprising a number of n DC coefficients, where n is an integer for which holds that $n \geq 1$, a plurality of most significant AC coefficients and a plurality of least significant AC coefficients, formatting means for including datablocks in a plurality of packets for recording in a track, a packet comprising a first packet portion including a synchronisation word and an identification word, a second packet portion comprising data reduced videoinformation, recording means for recording the plurality of packets in a track on the record carrier, to a reproduction arrangement and to a record carrier obtained with the recording arrangement.

A recording arrangement as defined in the opening paragraph is known from published European patent application No. 492,704A1 (PHN 13,546). The arrangement is in the form of an arrangement for recording a digital videosignal in slant tracks on a magnetic record carrier. It should however be noted that the invention is not restricted to the use in helical scan digital videorecorders, but is equally well applicable in the recording and reproduction on/of disc-like record carriers, either magnetic or optical record carriers.

Various proposals have been done to re-arrange the sequence of the data reduced videoinformation obtained from the dam compression means, prior to recording the information on the record carrier, so as to enable reproduction in a so-called feature mode. A feature mode in helical scan recorders/reproducers means that the transport speed of the longitudinal record carrier is other than the nominal speed, which is the speed during recording. In disk recorders/reproducers, the reproducing means, which include a magnetic or optical head, have a radial velocity in the feature mode which differs from the radial velocity during recording.

For a description of a feature mode reproduction in helical scan recorders/reproducers, reference is made to unpublished European patent application no. 92200069.0 (PHN 13.952). In this unpublished proposal, the DC coefficients and the most significant AC coefficients of datablocks are combined and recorded in a start portion of each track.

SUMMARY OF THE INVENTION

The invention aims at further improving the format of the videosignal recorded in the track on the record carrier, resulting in an improved reproduction in a feature mode.

The arrangement in accordance with the invention is characterized in that, the formatting means are adapted to store the information included in a first and a second datablock in the second packet portion of a first packet, such that the n DC coefficients of the first datablock are stored first, the plurality of most significant AC coefficients of the first datablock are stored next, the n DC coefficients of the second datablock are stored last in the second packet portion, and the plurality of most significant AC coefficients of the second datablock are stored before the n DC coefficients of the second datablock in the second packet portion.

The invention is based on the following recognition. The invention is based on the recognition that the DC coefficients and the most significant AC coefficients of a datablock should be stored in a packet as closely as possible to a synchronisation word. Therefore, the DC coefficients and the most significant AC coefficients of the first datablock are stored as closely as possible behind the synchronisation word in the first packet. Moreover, the DC coefficients and most significant AC coefficients of the second datablock are stored as far as possible at the back of the packet, so that they are stored closely as possible to, and before, the synchronisation word in the following packet.

In an embodiment of the invention, all datablocks can be stored in the same way in the packets. That means that, for recording further (third and fourth) datablocks, the arrangement may be characterized in that, the formatting means are further adapted to store the information included in a third and a fourth datablock in the second packet portion of a second packet, such that the n DC coefficients of the third datablock are stored first, the plurality of most significant AC coefficients of the third datablock are stored next, the n DC coefficients of the fourth datablock are stored last in the second packet portion, and the plurality of most significant AC coefficients of the fourth datablock are stored before the n DC coefficients of the fourth datablock in the second packet portion.

It should be noted that there need not be a restriction to the value of 2 for the number of datablocks to be stored in the second packet portion of a packet. In general, it is thus possible that data corresponding to a further datablock is stored in the second packet portion in between the locations in which the data corresponding to the first and the second datablock are stored.

In a further embodiment, the arrangement may be either characterized in that, the formatting means being adapted to store the information included in a fifth datablock and auxiliary signal information in the second packet portion of a third packet, such that the n DC coefficients of the fifth datablock are stored first, the plurality of most significant AC coefficients of the fifth datablock are stored next, and the auxiliary signal information is stored last in the second packet portion, or characterized in that, the formatting means being adapted to store the information included in a fifth datablock and auxiliary signal information in the second packet portion of a third packet, such that the auxiliary signal information is stored first, the n DC coefficients of the fifth datablock are stored last, in the second packet portion, and the plurality of most significant AC coefficients of the fifth datablock are stored before the n DC coefficients of the fifth datablock in the second packet portion. These embodiments offer the possibility to record each time five datablocks and an auxiliary signal in three subsequent packets.

During reproduction in a feature mode, the reproducing heads cross the tracks on the record carrier. When crossing a track, the reproduction arrangement is capable of shortly reading information from the track just crossed. If the head crosses a track just at the location where a synchronisation word and the identification word are recorded, this synchronisation word can be detected, and the reproducing arrangement can also read the information in that same track which is located in closely before and/or after the synchronisation word. This enables the decoding of the DC coefficients and the most significant AC coefficients of a datablock, so as to obtain a replica of the uncompressed videoinformation corresponding to a subpicture, using the identification word, which is an identification of the packet, and thus of the position of the subpicture on the screen, which has its videoinformation stored in said packet. Such decoding is sufficient for reproduction of the videosignal with an acceptable visual quality in the feature mode.

The arrangement may be further characterized in that it comprises count value generating means for generating a count value corresponding to the number of bytes needed to represent the AC coefficients of the datablocks included in the second packet portion of a packet. This measure, although described in combination with the measure of claim 1, has significance for itself, as also in the case that only one datablock would have been stored in the second packet portion of a packet, it supplies information about whether the amount of space available in a second packet portion is sufficient or not to store all the AC coefficients of the datablock.

The arrangement is further characterized in that, the count value generating means being adapted to generate for the i-th packet, a count value $CV_i$, corresponding to the number of bytes needed to represent the AC coefficients of the $(2i-1)$-th and $(2i)$-th datablock, the formatting means further being adapted to store the count value $CV_i$ in the second packet portion of the i-th packet, where i is 1 or 2. Moreover, if the count value $CV_i$ is smaller than or equal to the number of bytes $N_i$ available in that part of the second packet portion of the i-th packet located between the DC coefficients of the $(2i-1)$-th and $(2i)$-th datablock stored in said second packet portion, the formatting means are further adapted to store least significant AC coefficients of the $(2i-1)$-th datablock after the most significant AC coefficients of the $(2i-1)$-th datablock in said part of said second packet portion and least significant AC coefficients of the $(2i)$-th datablock are stored before the most significant coefficients of the $(2i)$-th datablock in said part of said second packet portion. As a result, if the amount of space available in a second packet portion store all the AC coefficients of a datablock, the surplus of coefficients is stored in one of the other packets.

It should be noted that the digital videoinformation to be stored in a packet generally includes parity information. This parity information is required to carry out an error correction step during reproduction. This parity information can be stored in various positions in a packet. The parity information can, as an example, be stored in a third packet portion in the packet. This third packet portion can be accommodated after the second packet portion in the packet, or can be accommodated between the stored AC coefficients in the second packet portion of a packet. This last possibility means that the second packet portion is divided into two parts.

Embodiments of the record carrier and reproducing arrangement in accordance with the invention are defined in the claims 15 to 18.

BRIEF DESCRIPTION OF THE DRAWINGS

These and other aspects of the invention will be further explained with reference to embodiments of the arrangement in the following figure description, in which FIG. 4 shows the sequence of packets, FIG. 5 including FIG. 5a to FIG. 5c shows the format of three subsequent packets, FIG. 6 including FIG. 6a to FIG. 6c shows the DC information for two datablocks, FIG. 15a shows the AC information of a second datablock that should be stored in the same second packet portion, FIG. 15b shows that part of the AC information of FIG. 15a that is stored in a temporary memory, FIG. 15c shows the pan of the AC information shown in FIG. 13b and in addition the surplus information of the AC information of FIG. 15a, FIG. 16 shows the storage of the AC information of FIG. 15a in the second packet portion memory, FIG. 19 shows the reproduced AC information of two datablocks, FIG. 22 shows a reproduction arrangement.

DETAILED DESCRIPTION OF THE PREFERRED EMBODIMENTS OF THE INVENTION

Figure 1:
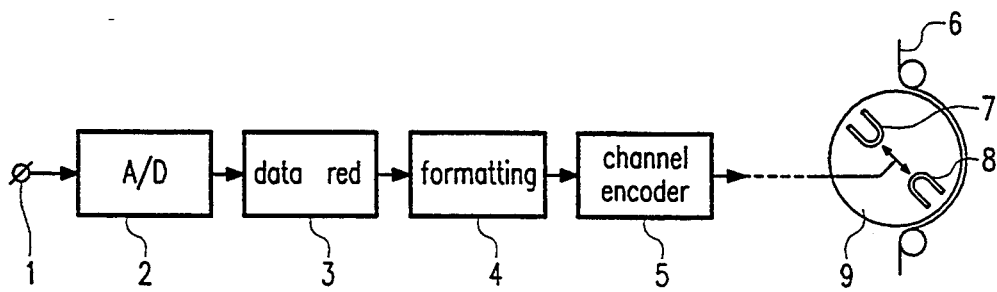
FIG. 1 shows an embodiment of the recording arrangement.

FIG. 1 shows in block diagram an embodiment of a helical scan recording arrangement, comprising an input terminal 1 for receiving the videosignal, which is applied to an A/D converter for digitizing the videosignal. The digitized videosignal is subsequently applied to a data reduction unit 3 in which the digitized videosignal is subjected to a DCT encoding, so as to reduce the amount of videoinformation. The datareduced videoinformation is applied to a formatting unit 4, in which the data reduced videoinformation is rearranged so as to store the information in packets. The serial datastream of the packets are subjected to a channel encoding in a channel encoding unit 5, and is subsequently recorded on slant tracks of a longitudinal record carrier 6 by means of recording heads 7 and 8 accommodated on a rotary head drum 9.

Data reduction carried out on the digitized videosignal in the data reduction unit 3 is well known in the art. Only a short explanation will be given.

Figure 2:
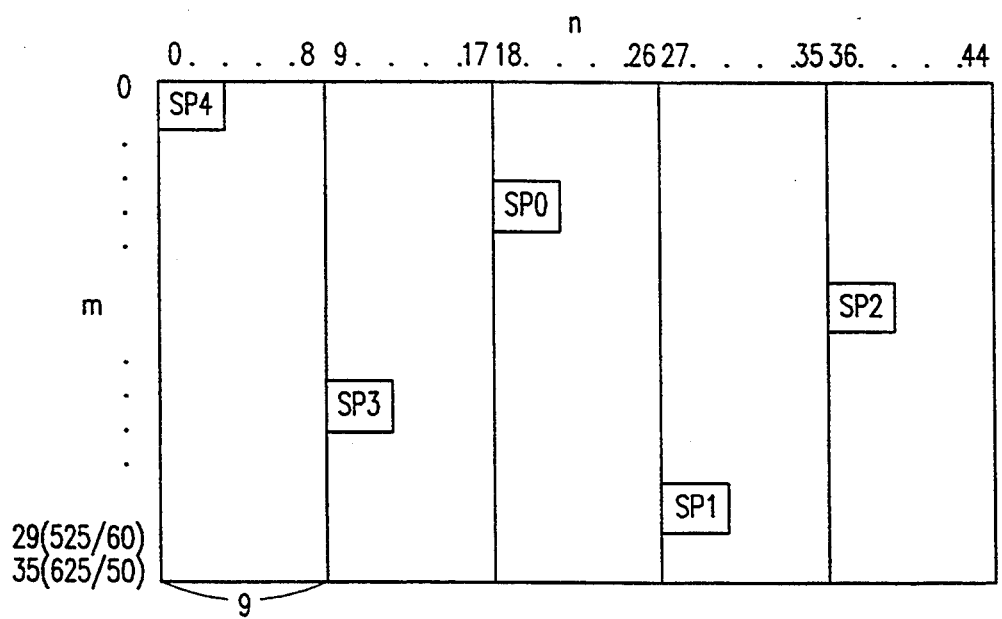
FIG. 2 shows a picture being divided into subpictures.
Figure 3:
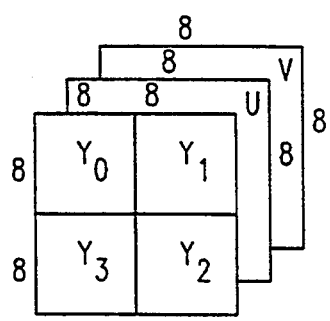
FIG. 3 shows the division of the videoinformation of a subpicture over six DCT blocks.

A picture is divided into subpictures of $16 \times 16$ pixels. The picture is divided into n subpictures in the horizontal direction and m subpictures in the vertical direction. n can be equal to 45, and m can be equal to 30 (for a 525 lines/60 Hz situation) or 36 (for the 625 lines/50 Hz situation). A number of five subpictures are shown in FIG. 2, denoted by $SP_0$ to $SP_4$. The videoinformation for each subpicture comprises 6 DCT blocks, shown in FIG. 3, that is: four luminance blocks $Y_0$ to $Y_3$ and two chrominance component blocks U and V. The four luminance blocks result from the four $8 \times 8$ subpicture areas in the $16 \times 16$ subpicture, and the two chrominance component blocks result from the $8 \times 8$ pixels equally spaced in the $16 \times 16$ subpicture. Data reduction carried out on a subpicture $SP_x$ results for each of the 6 DCT blocks, in a DC coefficient and a plurality of AC coefficients. A certain number of those AC coefficients are considered most significant AC coefficients and the remaining are least significant AC coefficients. The DC and AC coefficients of the 6 DCT blocks corresponding to a subpicture are combined into a datablock, such that the 6 DC coefficients come first, then come the most significant AC coefficients of the 6 DCT blocks and then come the least significant AC coefficients. The datablock corresponding to a subpicture $SP_x$, will be denoted by $MB_x$, where x runs from 0 to 4. The datablocks $MB_x$ are supplied to its output by the data reduction unit 3.

The datablocks are applied to the input of the formatting unit 4. The formatting unit 4 stores the information contained in the datablocks in a serial datastream, which is in the form of a sequence of packets $P_i$. FIG. 4 shows the serial datastream, which is the output signal of the formatting unit 4.

FIG. 5 shows in (a) the contents of the packet $P_i$, in (b) the contents of the packet $P_{i+1}$ and in (c) the contents of the packet $P_{i+2}$. The packets each comprise a first packet portion $PP_1$, a second packet portion $PP_2$ and a third packet portion $PP_3$. The first packet portions $PP_1$ comprise a synchronisation word SW and an identification word ID. The identification word is (indirectly) an indication for the position in the picture of the subpicture(s) which has its (their) videoinformation stored in said packet.

The third packet portion $PP_3$ of the packets comprise parity information. The second packet portions comprise the data reduced videoinformation contained in the datablocks. More specifically, the second packet portions of three subsequent packets $P_i$, $P_{i+1}$ and $P_{i+2}$ comprise the data reduced videoinformation comprised in the five datablocks $MB_0$ to $MB_4$.

As has been said earlier, it should be noted here that the location where the parity information is stored in the packets can be different from the location shown in FIG. 5. Further, the location where the Auxiliary information and the fifth datablock are stored in the packet $P_{i+2}$ can be interchanged.

The formatting unit 4 functions as follows in order to store the contents of the five datablocks in the three packets. The DC coefficients of the first datablock $MB_0$, denoted by $DC_0$ are stored first in the second packet portion $PP_2$ of the packet $P_i$. The DC coefficients of the second datablock $MB_1$, denoted by $DC_1$ are stored last in the packet portion $PP_2$ of the packet $P_i$. The most significant AC coefficients of the first datablock $MB_0$, denoted by $MAC_0$ are stored after the DC coefficients $DC_0$ in the second packet portion $PP_2$ of the packet $P_i$. The most significant AC coefficients of the second datablock $MB_1$, denoted by $MAC_1$ are stored before the DC coefficients $DC_1$ in the packet portion $PP_2$ of the packet $P_i$. If there is still memory space available in the packet portion $PP_2$ between the most significant AC coefficients $MAC_0$ and $MAC_1$, this room will be used to store the least significant AC coefficients, denoted LAC of the first and/or second datablock $MB_0$ and $MB_1$.

In an equivalent way, the contents of the datablocks $MB_2$ and $MB_3$ are stored in the second packet portion $PP_2$ of the packet $P_{i+1}$, as is shown in FIG. 5(b).

The DC coefficients of the fifth datablock $MB_4$, denoted by $DC_4$ are stored first in the second packet portion $PP_2$ of the packet $P_{i+2}$. The most significant AC coefficients of the fifth datablock $MB_4$, denoted by $MAC_4$ are stored after the DC coefficients $DC_4$ in the second packet portion $PP_2$ of the packet $P_{i+2}$. In the case that an auxiliary signal AUX must be stored in the packets as well, this auxiliary signal is stored last in the packet portion $PP_2$ of the packet $P_{i+2}$. If there is still memory space available in the packet portion $PP_2$ between the most significant AC coefficients $MAC_4$ and the auxiliary signal AUX, this room will be used to store the least significant AC coefficients, denoted LAC of the fifth datablock $MB_4$.

Further, count values $CV_1$, $CV_2$ and $CV_3$ are stored in the second packet portions $PP_2$ of the packets $P_i$, $P_{i+1}$ and $P_{i+2}$. The count value $CV_1$ relates to the amount of storage capacity (number of bytes) needed to store the AC coefficients of the datablocks $MB_0$ and $MB_1$. The count value $CV_2$ relates to the amount of storage capacity needed to store the AC coefficients of the datablocks $MB_2$ and $MB_3$. The count value $CV_3$ relates to the amount of storage capacity needed for storing the AC coefficients of the datablock $MB_4$.

As an example, the packets $P_i$ can be 141 bytes, of 8 bits each, long. The first packet portion $PP_1$ can be 5 bytes long, 2 bytes for the sync word SW and 3 bytes for the ID word, and the third packet portion $PP_3$ can be 8 bytes long. This results in 128 bytes available for the second packet portion $PP_2$.

The 6 DC coefficients for a datablock can, again as an example, be expressed in 9 bits, requiring at least 7 bytes for storing the DC coefficients in the second packet portion $PP_2$. As some additional information is stored together with the DC coefficients, the $DC_x$ information requires 9 bytes. FIG. 6a shows how the DC coefficients of the datablock $MB_0$, and thus also the DC coefficients of the datablocks $MB_2$ and $MB_4$ are stored in the second packet portion. First, the 8 most significant bits of the 9-bit DC coefficients for the 6 DCT blocks $Y_0$ to $Y_3$, U and V (see FIG. 3) denoted by $c_0$ to $c5$ respectively, are stored. Next follows 4-bit words $w_0$ to $w_5$. The word $w_0$ comprises the ninth bit of the DC coefficient for the first DCT block $Y_0$, a motion bit (1 bit) which has a relation to the presence or absence of motion between corresponding subpictures of two directly succeeding pictures, and a 2-bit word, needed for the quantizer settings used in an adaptive quantization step. Reference is made in this respect to the publication 'Use of activity classes in adaptive transform image coding' by J. I. Gimlett, IEEE Trans. on Comm., Vol COM-23, no. 7, pp. 785-6.

In the same way, the ninth bit of the DC coefficients, the motion bit and the quantizer settings for the other DCT blocks are stored as 4-bit words $W_1$ to $w_5$, as shown in FIG. 6a.

FIG. 6b shows how the 9-bit DC coefficients, the motion bit and the quantizer settings for the DCT blocks in the datablock $MB_1$ are stored. The $DC_1$ information is stored in the reverse order in the packet portion $PP_2$ of the packet $P_i$, compared to the order in which the $DC_0$ information is stored in said packet portion. The $DC_3$ information for the datablock $MB_3$ is stored in the same way in the packet portion $PP_2$ of the packet $P_{i+1}$ as the $DC_1$ information for datablock $MB_1$.

It is assumed for the moment that the storage of the AUX information in the (each third) packet $P_{i+2}$ requires 6 bytes, and that the count values require one byte. This means that, for the storage of the total AC information of the five datablocks, there are 109 bytes available in the packets $P_i$ and $P_{i+1}$, and 112 bytes available in the packet $P_{i+2}$.

Figures 7, 8, 9A, 9B, 10:
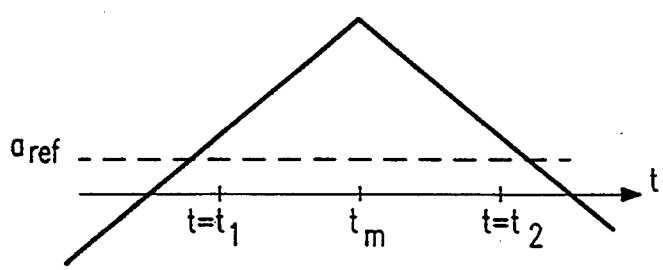
FIG. 7 shows the contents of the second packet portion of a packet in which all DC and AC information of two datablocks are stored, and an open space remains.
FIG. 8 shows the contents of the second packet portion of a packet in which DC and AC information of two datablocks are stored, such that no open space remains, FIG. 9 including FIG. 9a to FIG. 9b shows two examples of the contents of the second packet portion of a third packet.
FIG. 10 shows the envelope of the videosignal read from the record carrier, when a track is crossed during read-out in a feature mode, FIG. 11 including FIG. 11a to FIG. 11c shows three examples of signals read out during the feature mode.

Suppose now, that the count value $CV_1$ indicates that the AC coefficients of the datablocks $MB_0$ and $MB_1$ require only 63 bytes for storage, that is: $CV_1 = 63$. FIG. 7 now shows how the AC coefficients of the datablocks $MB_0$ and $MB_1$ are stored in the second packet portion $PP_2$ of the packet $P_i$. The most significant AC coefficients in the datablock $MB_0$ are stored first after the DC coefficients $DC_0$ in the space denoted by $AC_0$ in FIG. 7. The most significant AC coefficients of the datablock $MB_1$ are stored last in the space denoted by $AC_1$, before the DC coefficients $DC_1$. The least significant AC coefficients of the datablocks $MB_0$ and $MB_1$ are stored in the space in the packet portion formed between the most significant AC coefficients of the datablock $MB_0$ and the most significant AC coefficients of the datablock $MB_1$, so as to fill the spaces denoted $AC_0$ and $AC_1$. The spaces $AC_0$ and $AC_1$ have a length equal to $CV_1/2$, if $CV_1$ is even, whilst the lengths of $AC_0$ and $AC_1$ equal $(CV_1+1)/2$ and $(CV_1-1)/2$ respectively, if $CV_1$ is odd. It should thus be noted that, if the amount of AC information in the datablock $MB_0$ is larger (less) than the amount of AC information in the datablock $MB_1$, least significant AC coefficients in the datablock $MB_0$ ($MB_1$) are stored in the space $AC_1$ ($AC_0$). As can be seen in FIG. 7, an empty space of 46 bytes remains in the packet portion $PP_2$.

FIG. 8 shows how the AC coefficients of the datablocks $MB_2$ and $MB_3$ are stored in the second packet portion $PP_2$ of the packet $P_{i+1}$. The count value $CV_2$ is assumed to be equal to 145, and thus larger than 109. The most significant AC coefficients in the datablock $MB_2$ are stored first after the DC coefficients $DC_2$ in the space denoted by $AC_2$ in FIG. 8. The most significant AC coefficients of the datablock $MB_3$ are stored last in the space denoted by $AC_3$, before the DC coefficients $DC_3$. The least significant AC coefficients of the datablock $MB_2$ and $MB_3$ are stored in the space in the packet portion formed between the most significant AC coefficients of the datablock $MB_2$ and the most significant AC coefficients of the datablock $MB_3$, so as to fill the spaces denoted $AC_2$ and $AC_3$. The spaces $AC_2$ and $AC_3$ have a length equal to 55 and 54 bytes respectively. A surplus of AC information in the datablocks $MB_2$ and $MB_3$, which is equal to 36 ($=145-109$) bytes, can not be stored in the spaces $AC_2$ and $AC_3$ of the second packet portion $PP_2$ of the packet $P_{i+1}$. This surplus can be stored in the empty space of 46 bytes still available in the packet $P_i$, see FIG. 7.

The maximum value for the 8-bit word $CV_i$, which is the value 255, is reserved for the situation where the number of bytes needed to store the AC coefficients of the $(2i-1)$-th and $(2i)$-th datablock is larger than or equal to 255. In this situation the other two CV-values will be smaller than 109. Although the exact value for $CV_i$ in this situation is not known, it is possible to extract the information belonging to each datablock from the three packets.

FIG. 9 shows how the AC coefficients of the datablock $MB_4$ are stored in the second packet portion $PP_2$ of the packet $P_{i+2}$. The count value $CV_3$ is assumed to be equal to 59 in FIG. 9a, and equal to 129 in FIG. 9b. The most significant AC coefficients in the datablock $MB_4$ are stored first after the DC coefficients $DC_4$ in the space denoted by $AC_4$ in FIG. 9a and b. The least significant AC coefficients of the datablock $MB_4$ are stored next in the space $AC_4$. In the situation of FIG. 9a, an empty space of 53 bytes remains, in which the surplus of AC information from one or both of the other packets $P_i$ and $P_{i+1}$ can be stored. In the situation of FIG. 9b, 112 bytes of the AC information in the datablock $MB_4$ can be stored in the second packet portion of the packet $P_{i+2}$. The surplus of AC information, in total 16 ($129-112$) bytes can be stored in the empty spaces (if present) in the packets $P_i$ and $P_{i+1}$.

Storing the data reduced information in the packets in the way described has the following advantage, when reproducing the information during a feature mode, that is: with the record carrier transport speed being different from nominal. If a reproduction head crosses a track, the envelope of the signal read by the head increases to a maximum at a time instant $t_m$ when the head is located precisely on the track. When leaving the track, the envelope decreases. This is schematically shown in FIG. 10, where the amplitude of the envelope signal is shown as a function of time. A reliable detection of the signal recorded from the signal reproduced by the head, is possible if the amplitude of the envelope is above a predetermined reference amplitude $a_{ref}$.

Figure 11A:
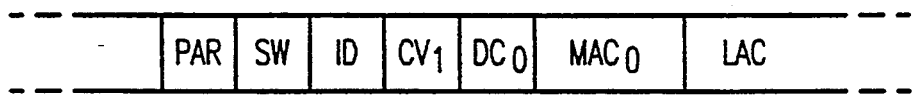

Three situations will now be described, namely a first one where a sync word is located at the time instant $t_1$, a second one where the sync word is located at the time instant $t^m$, and a third one where the sync word is located at the time instant $t_2$. In the first situation, further explained using FIG. 11a, the reproducing arrangement reproduces the start portion of a packet, including the sync word, the ID word, the DC coefficients and the most significant AC coefficients of the datablock recorded in that packet. FIG. 11a shows how the most significant information, which is the DC coefficients and the most significant AC coefficients, of the first datablock $MB_0$ is detected in this way. Decoding of the data reduced video information of the subpicture corresponding to the first datablock, based on the DC coefficients and the most significant AC coefficients is possible, in order to obtain a subpicture of a reduced quality. By means of the ID word also reproduced, it is possible to position the subpicture at its correct location in the picture.

Figure 11B:
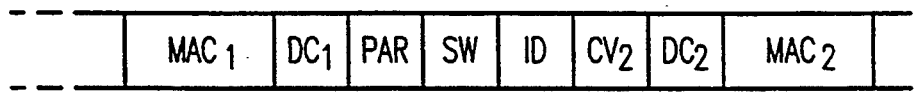

In the second situation, further explained using FIG. 11b, the reproducing arrangement reproduces the final portion of a packet and the start portion of the next packet. That means that the DC coefficients and the most significant AC coefficients of a certain datablock ($MB_1$), the sync word, the ID word, and the DC coefficients and most significant AC coefficients of another datablock ($MB_2$) are reproduced. Decoding of the data reduced video information of the subpictures corresponding to the datablocks $MB_1$ and $MB_2$, based on the DC coefficients and the most significant AC coefficients of those datablocks, is now possible in order to obtain two subpictures having a reduced quality. By means of the ID word also reproduced, it is possible to position the two subpictures at their correct locations in the picture.

Figure 11C:
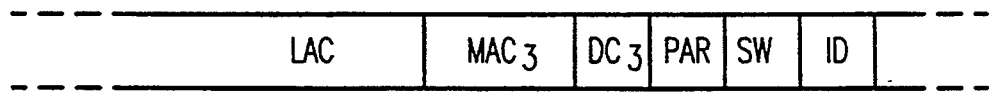

In the third situation, further explained using FIG. 11c, the reproducing arrangement reproduces the final portion of a packet, including the DC coefficients and the most significant AC coefficients of the datablock recorded in that packet and the sync word and the ID word in the next packet. FIG. 11c shows how the most significant information, which is the DC coefficients and the most significant AC coefficients, of the fourth datablock $MB_3$ is detected in this way. Decoding of the data reduced video information of the subpicture corresponding to the fourth datablock, based on the DC coefficients and the most significant AC coefficients is possible, in order to obtain a subpicture having a reduced quality. By means of the ID word also reproduced, it is possible to position the subpicture at its correct location in the picture.

As a result high non-nominal transport speeds are possible in a feature mode, whilst reproduction and decoding of the reproduced information still results in pictures of sufficient quality for recognition.

A further explanation will be given of the storage of the AC coefficients of the various datablocks in the AC areas given in FIGS. 7, 8 and 9.

First, the storage of the AC coefficients in datablock $MB_0$ will be described. As shown in FIG. 7, 32 bytes of memory space is available in the space $AC_0$ for the storage of the AC coefficients of the datablock $MB_0$, and 31 bytes of memory space is available in the space $AC_1$ for the storage of the AC coefficients of the datablock $MB_1$. The memory space corresponding to the 32 bytes in the $AC_0$ space and the 31 bytes in the $AC_1$ space is distributed over the six DCT blocks as follows:

| DCT block | $MB_0$ | $MB_1$ |
| --- | --- | --- |
| $Y_0$ | 6 bytes | 6 bytes |
| $Y_1$ | 6 bytes | 6 bytes |
| $Y_2$ | 6 bytes | 6 bytes |
| $Y_3$ | 6 bytes | 6 bytes |
| U | 4 bytes | 4 bytes |
| V | 4 bytes | 3 bytes |

-continued

The division over the various DCT blocks is done in accordance with the following rule. For the Y-DCT blocks: divide the available number of bytes (32 or 31) by 5. The integer value of the division result is the reserved number of bytes for each of the Y-DCT blocks. Divide the available number of bytes (32 or 31) by 10. The integer value of the division result is the reserved number of bytes for the U- and V-DCT blocks. If there is a remainder, then first the U- and V-DCT blocks get one byte more, and then the Y-DCT blocks.

Figure 12:
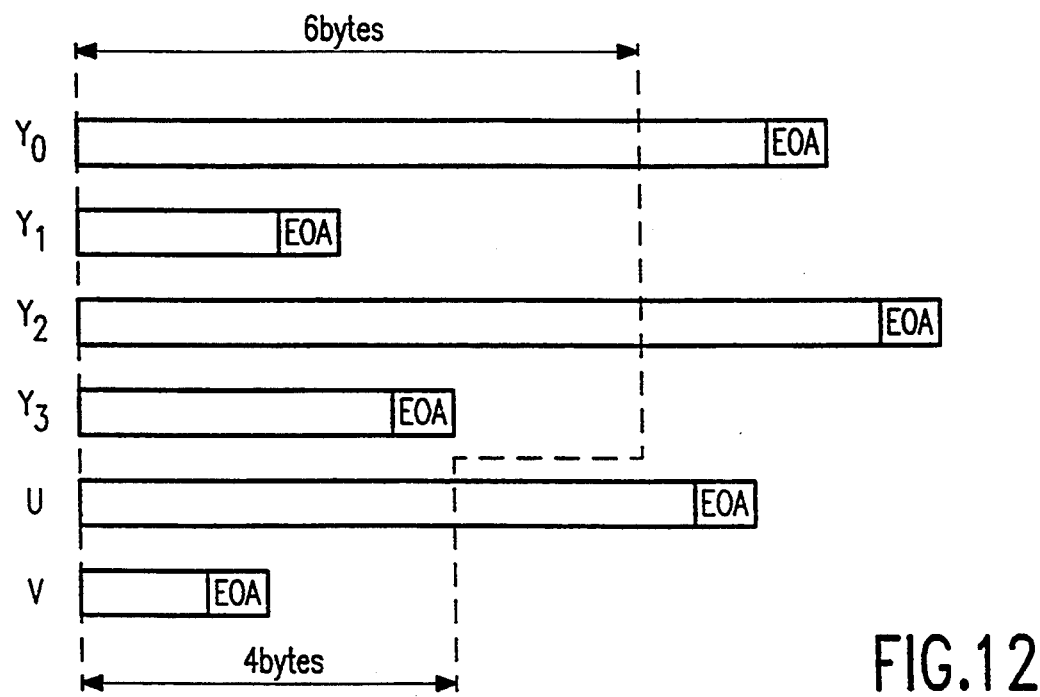
FIG. 12 shows the AC information of a datablock.

FIG. 12 shows the AC information for the datablock $MB_0$. The top array schematically shows the serial sequence of the AC coefficients obtained from DCT coding the $Y_0$-DCT block. The second array shows the serial sequence of the AC coefficients obtained from DCT coding the $Y_1$-DCT block, and so on. The figure shows all the AC coefficients serially after each other, the most significant one first, then the most significant but one, and so on, until the least significant one is stored last in the array, followed by an EOA (end of array) word. No boundaries between the coefficients serially sequenced are shown, for the reason that a variable length coding has been carried out in the DCT coding step, so as to obtain coefficients of variable lengths.

Figure 13A:
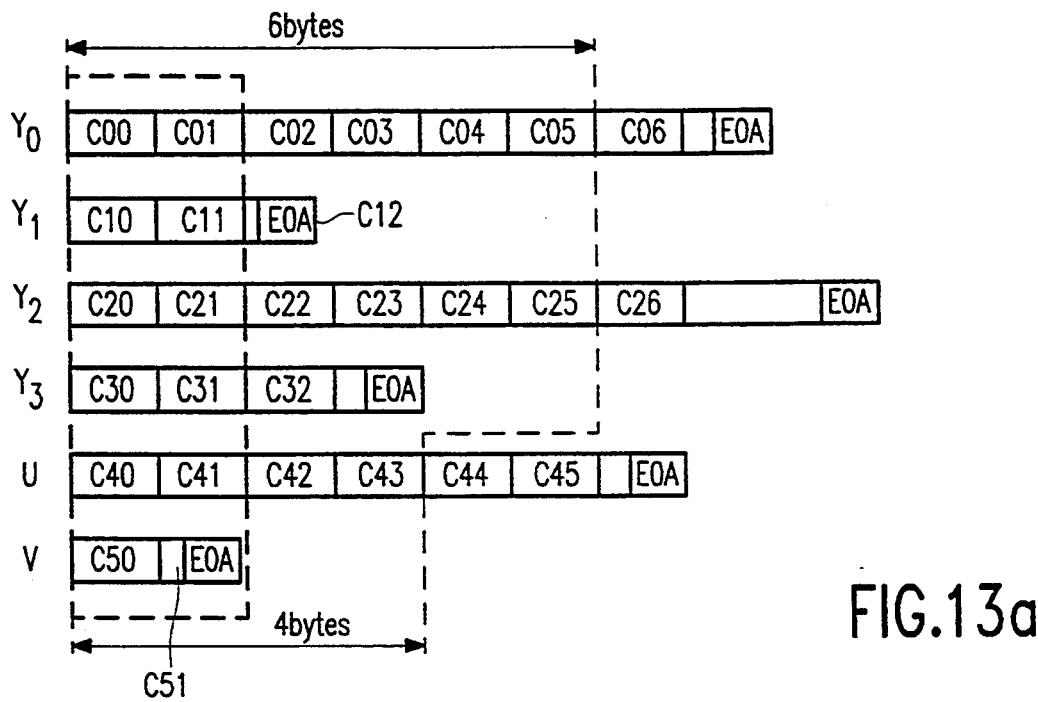
FIG. 13a shows the AC information of FIG. 12, divided into 8-bit bytes, to be stored in the second packet portion of a packet.
Figure 13B:
FIG. 13b shows that part of the AC information of FIG. 13a that is stored in a temporary memory.
Figure 14:
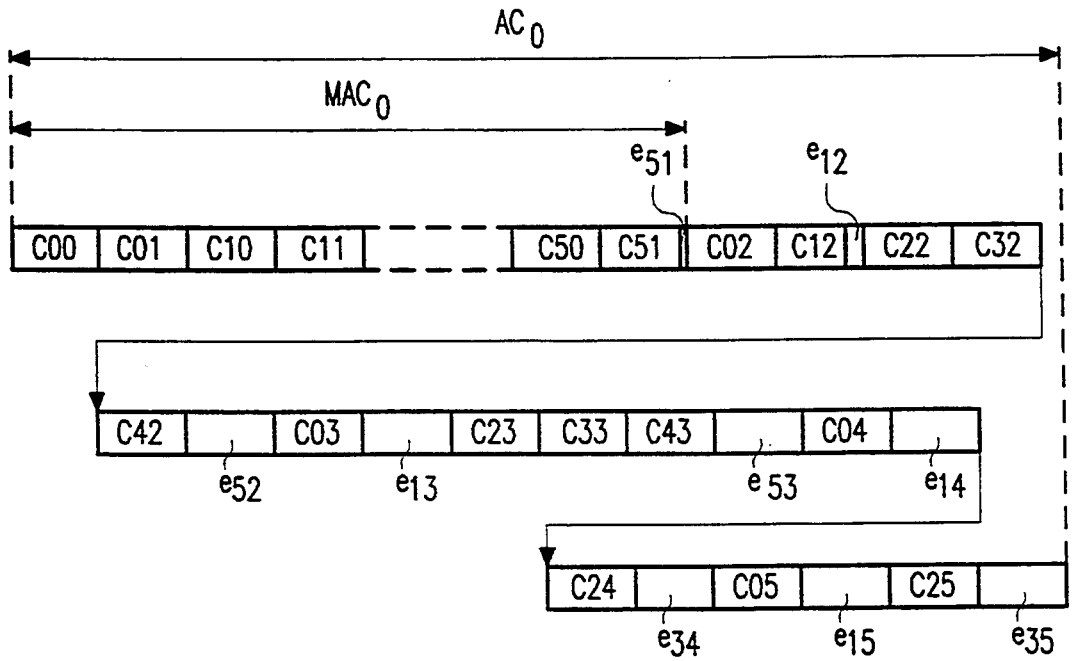
FIG. 14 shows the storage of the AC information of FIG. 13a into the second packet portion memory.

The storage of the AC information in the space $AC_0$ is shown with reference to FIG. 13 and 14, FIG. 13a showing the same arrays as FIG. 12, the arrays now being divided into bytes of 8 bits each, and FIG. 14 showing in serial form the memory space of 109 bytes, being that part of the second packet portion between the DC coefficients, that is the $AC_0$ and $AC_1$ area and the empty area between the $AC_0$ and $AC_1$ area in FIG. 7.

It should be noted that the surplus bytes in the various Y-arrays (that are the total number of bytes in each array minus the first six bytes, in this example), and the surplus bytes in the U- and V-arrays (that are the total number of bytes in the U- and V-arrays, minus the first four bytes, in this example) are temporarily stored serially in a surplus memory, shown in FIG. 13b. First, the surplus bytes of the Y-DCT arrays, and thereafter the surplus bytes of the U- and V arrays are stored in the surplus memory.

FIG. 14 shows the memory $AC_0$ in which the bytes are stored. First two bytes $c_{00}$ and $c_{01}$ in the $Y_0$-array, see FIG. 13, are stored in the $AC_0$ area, next the first two bytes $c_{10}$ and $c_{11}$ in the $Y_1$-array are stored in the $AC_0$ area, next the first two bytes $c_{20}$ and $c_{21}$ in the $Y_2$-array are stored. This continues until the first two bytes $c_{50}$ and $c_{51}$ in the V-array are stored in the $AC_0$ area. The reason for storing the first two bytes of each array together, is that the AC coefficients can be 16-bit long at maximum, so that at least one most significant AC coefficient of each DCT block is stored as closely as possible behind the DC coefficients of the DCT blocks. The information contained in the 6 times 2 bytes recorded firstly in the $AC_0$ area can be considered as the most significant AC information stored in the $MAC_0$ area in FIG. 5a. It should be noted that the memory location in which the byte $c_{51}$ is stored is partly empty, because the byte $c_{51}$ is less than 8 bits long, as shown in FIG. 13a. The empty location in the memory $AC_0$ is indicated by $e_{51}$.

The storage of the AC information in the $AC_0$ area is continued by storing the following bytes after each other: $c_{02}$, $c_{12}$, $c_{22}$, $c_{32}$, $c_{42}$, see also FIG. 14. The byte $c_{12}$ is also less than 8 bits long, so that an empty location $e_{12}$ is present in the memory $AC_0$. As there is no $c_{52}$ byte in the V-array, see FIG. 13, an empty location $e_{52}$ of one byte long is created in the area $AC_0$. Next, the byte $c_{03}$ is stored, followed by an empty location $e_{13}$ of one byte long. The byte $c_{23}$ is stored thereafter, followed by the bytes $c_{33}$ and $c_{43}$. An empty byte $e_{53}$ follows. Next the byte $c_{04}$ is stored, followed by an empty byte $e_{14}$. The byte $c_{24}$ is stored next, followed by empty byte $e_{34}$, byte $c_{05}$, empty byte $e_{15}$, byte $c_{25}$ and empty byte $e_{35}$. The empty byte $e_{35}$ forms the termination of the $AC_0$ memory space in the second packet portion of FIG. 7.

Next, the data stored in the surplus memory of FIG. 13b, are stored serially in the empty locations in the memory $AC_0$ of FIG. 13a.

The first byte, which is the byte $c_{60}$ is now stored in the empty locations in the $AC_0$ memory space, that is partly in the locations $e_{51}$, $e_{12}$ and $e_{52}$. The next bytes in the surplus memory of FIG. 13b, starting with the byte $c_{07}$, are stored in the empty locations.

Two situations can occur. In a first situation, the storage of all the bytes of the coefficients shown in FIG. 13 can be stored within the memory space $AC_0$. In a second situation, the memory space $AC_0$ is too small to store all the bytes of FIG. 13. In the second situation, the remaining surplus of bytes need to be stored somewhere else. That will be in the remaining empty space in the memory space $AC_1$, as the total memory capacity of the $AC_0$ and $AC_1$ memory areas suffices for storing all the AC information of the datablocks $MB_0$ and $MB_1$.

FIG. 15a shows all the AC information for the datablock $MB_1$. The AC coefficients for the various DCT blocks have been shown in reverse order, for clarity reasons, as they are stored in reverse order, compared to the AC coefficients of the datablock $MB_0$, in the memory space $AC_1$. FIG. 16 shows how the bytes are stored in the memory space $AC_1$, namely from the right to the left.

First, the surplus bytes in the Y-DCT blocks (that are the total number of bytes in each Y-array minus the first six bytes, in this example) are serially stored in a surplus memory, see FIG. 15b. Also the surplus bytes in the U-DCT block (that are the total number of bytes in the U-array, minus the first four bytes, in this example), and the surplus bytes in the V-DCT block (that are the total number of bytes in the V-array, minus the first three bytes, in this example) are stored in the surplus memory.

The storage of the bytes in the memory $AC_1$ as given in FIG. 16 is as follows. First two bytes $c_{00}$ and $c_{01}$ in the $Y_0$-array, see FIG. 15, are stored in the $AC_1$ area, next the first two bytes $c_{10}$ and $c_{11}$ in the $Y_1$-array are stored in the $AC_1$ area, next the first two bytes $c_{20}$ and $c_{21}$ in the $Y_2$-array are stored. This continues until the first two bytes $c_{50}$ and $c_{51}$ in the V-array are stored in the $AC_1$ area. In this way, at least one most significant AC coefficient of each DCT block is stored as closely as possible before the corresponding DC coefficients of the DCT blocks. The information contained in the 6 times 2 bytes recorded in the fight end of the $AC_1$ area can be considered as the most significant AC information stored in the $MAC_1$ area in figure 5a.

The storage of the AC information in the $AC_1$ area is continued by storing the following bytes after each other: $c_{02}$, $c_{12}$, $c_{22}$, $c_{32}$, $c_{42}$, see also FIG. 16. This is continued until the byte $c_{35}$ is stored in the most left byte location of the memory space $AC_1$. As the byte $c_{24}$ is less than 8 bit long, an empty space $e_{24}$ is present. Further, there is no $c_{25}$ byte in the $Y_3$-array, see FIG. 15, so that an empty location $e_{25}$ of one byte long is present in the area $AC_1$. The byte $c_{35}$ forms the termination of the $AC_1$ memory space in the second packet portion of FIG. 7.

Next, the information stored in the surplus memory of FIG. 15b, starting with the byte $c_{06}$, is stored in the empty locations of the $AC_1$ area.

Now the situation occurs that the memory space $AC_1$ can not store all the remaining bytes stored in the surplus memory of FIG. 15b. That means that the surplus of bytes, as an example indicated by $LAC_{1s}$ in FIG. 15b, must be stored else, namely in the remaining empty space in the memory space $AC_0$. To that purpose, the surplus information $LAC_{1s}$ is added to the data stored in the surplus memory for the datablock $MB_0$. This is shown in FIG. 15c, where the first part, indicated by 'FIG. 13b' is the information stored in the surplus memory, as also shown in FIG. 13b, which is followed by the surplus information $LAC_{1s}$. The total information shown in FIG. 15c is thus stored in the empty spaces present in the $AC_0$ area, that is: within the first 32 bytes in the second packet portion of the packet $P_1$ in FIG. 7.

The remaining empty space of 46 bytes in the second packet portion of the packet in FIG. 7 can be used for storage of the surplus bytes in the AC information of the other datablocks $MB_2$, $MB_3$ and $MB_4$.

Now, it is assumed that the count value $CV_1$ equals 141, the count value $CV_2$ equals 85 and the count value $CV_3$ equals 98. Further, it is assumed that the AC information of the $MB_1$ datablock is larger than the AC information of the $MB_0$ datablock, and that the AC information of the $MB_3$ datablock is larger than the $MB_2$ datablock.

Figure 17:
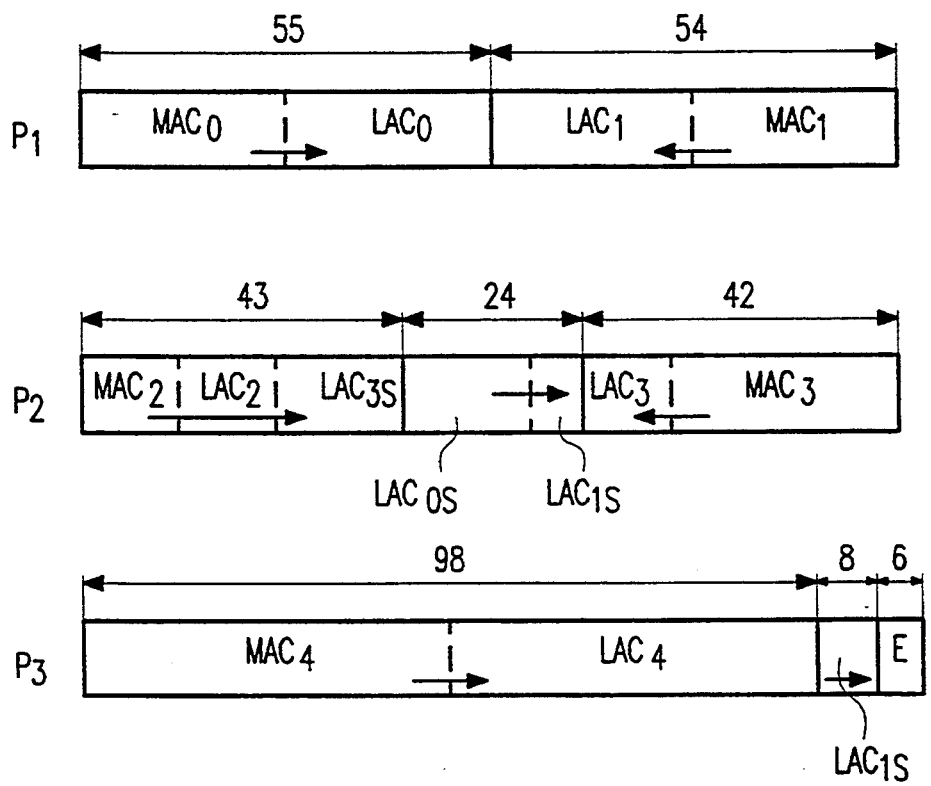
FIGS. 17 and 18 show two examples of how the second packet portions of the three subsequent packets are filled with the AC information of the five datablocks.

FIG. 17 shows that 55 bytes of AC information, indicated by $MAC_0$, of the datablock $MB_0$, and that 54 bytes of AC information, indicated by $MAC_1$, of the datablock $MB_1$ is stored in the second packet portion of the packet $P_1$. The total AC information of the datablock $MB_2$, denoted by $MAC_2$ and $LAC_2$, is stored within the 43 first bytes of the second packet portion of the packet $P_2$. Further, 42 bytes of the AC information of the datablock $MB_3$, indicated by $MAC_3$ and $LAC_3$, are stored at the end of the second packet portion of the packet $P_2$. The surplus of AC information of the datablock $MB_3$ over the 42 bytes already stored, is now stored in the empty locations in the first 43 bytes of the second packet portion of the packet $P_2$. This is denoted by $LAC_{3s}$ in FIG. 17. Next, the 24 byte large empty space in the packet $P_2$ is now filled with the surplus of AC information of the datablock $MB_0$ first, and if there is still empty space available, with surplus of AC information of datablock $MB_1$. This is denoted by $LAC_{0s}$ and $LAC_{1s}$ respectively. The total AC information of the datablock $MB_4$, denoted by $MAC_4$ and $LAC_4$, is stored within the 98 first bytes of the second packet portion of the packet $P_3$. The remaining space of 13 bytes is used to store the remaining 8 bytes of the surplus of the AC information of the datablock $MB_1$, indicated by $LAC_1$.

The arrows in the memory spaces indicate the direction in which the AC information in the various datablocks is stored in the spaces. More specifically, the surplus of AC information of a datablock that is stored in another packet is always stored from left to right in a packet, as is shown with reference to the $LAC_{0s}$ and $LAC_{1s}$ information in the second and third packet $P_2$ and $P_3$. Further, it appears that an empty space E of six bytes remains in the third packet $P_3$.

Figure 18:
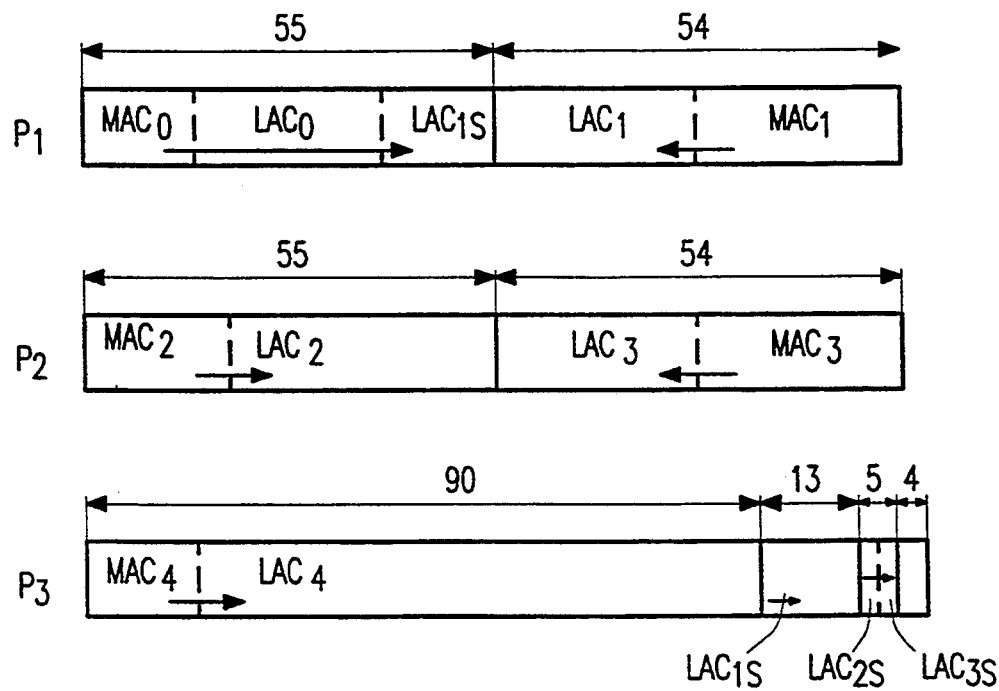

A second example is given in relation to FIG. 18. It is assumed that the count value $CV_1$ equals 122, the count value $CV_2$ equals 114 and the count value $CV_3$ equals 90. Further, it is assumed that the AC information of the $MB_0$ datablock is smaller than 55 bytes, and that the AC information of the $MB_2$ datablock is larger than 55 bytes, and that datablock $MB_3$ is larger than 54 bytes.

FIG. 18 shows that the total AC information of the datablock $MB_0$, indicated by $MAC_0$ and $LAC_0$, is stored within the first 55 bytes of the second packet portion of the packet $P_1$. Further, 54 bytes of AC information, indicated by $MAC_1$ and $LAC_1$, of the datablock $MB_1$ is stored in the last 54 bytes of the second packet portion of the packet $P_1$. Part of the surplus AC information, denoted $LAC_{1s}$, of the datablock $MB_1$ is stored in the empty positions within the first 55 bytes of the second packet portion of the packet $P_1$. 55 bytes of the AC information of the datablock $MB_2$ is stored first in the areas denoted $MAC_2$ and $LAC_2$ in the second packet portion of the packet $P_2$. Further, 54 bytes of the AC information of the datablock $MB_3$, indicated by $MAC_3$ and $LAC_3$, are stored at the end of the second packet portion of the packet $P_2$. The total AC information of the datablock $MB_4$, denoted by $MAC_4$ and $LAC_4$, is stored within the first 90 bytes of the second packet portion of the packet $P_3$. The remaining space of 22 bytes can be used to store the remaining 13 bytes of the surplus of the AC information of the datablocks $MB_1$, denoted by $LAC_{1s}$ and the remaining 5 bytes of the surplus of the AC information of the datablocks $MB_2$ and $MB_3$, denoted by $LAC_{2s}$ and $LAC_{3s}$. An empty space of 4 bytes remains.

Next a description will be given of the retrieval of the data reduced video information from the three packets. Upon reproduction during nominal speed, all information from the three packets are read. The three count values $CV_1$, $CV_2$ and $CV_3$ can thus be retrieved from the three packets, so that the reproducing arrangement knows how many bytes of AC information are included in the five datablocks $MB_0$ to $MB_4$ stored in the three subsequent packets.

In a situation where a count value, such as $CV_1$, is smaller than 109, the reproducing arrangement knows that the AC information of two datablocks (in the example: the datablocks $MB_0$ and $MB_1$) is completely stored in the said packet (and that the $AC_0$ and $AC_1$ areas —memories— have the same amount of storage space $CV_1/2$, if $CV_1$ is even, or $(CV_1+1)/2$ and $(CV_1-1)/2$ respectively, if $CV_1$ is odd).

Retrieving the AC information, such as the AC information shown in FIG. 13a from the $AC_0$ area shown in FIG. 14 is as follows. First the two bytes $c_{00}$ and $c_{01}$ of the $Y_0$-DCT block are taken, next the two bytes $c_{10}$ and $c_{11}$ of the $Y_1$-DCT block. This continues until all the first two bytes of the five DCT blocks are read from the $AC_0$ area. The reproducing arrangement has detected the end-of-array word EOA in the byte $c_{51}$, so that it knows that no further AC information for the V-DCT block is available. Further, the information stored in the $e_{51}$ location is stored in a temporary memory. Next, the bytes $c_{02}$, $c_{12}$, $c_{22}$, $c_{32}$, $c_{42}$ are retrieved in this order. Upon retrieving the $c_{12}$ byte, the reproducing arrangement has again detected an EOA-word, so that it knows that no further bytes are needed for the $Y_1$-DCT block.

The information stored in the $e_{12}$ location is stored in the surplus memory after the $e_{51}$ information.

The next byte, stored in the location $e_{52}$ is stored in the surplus memory. The next byte is retrieved as the byte $c_{03}$. The byte stored in the location $e_{13}$ is stored in the surplus memory directly after the byte $e_{52}$. Next, the bytes $c_{23}$, $c_{33}$ and $c_{43}$ are retrieved. Upon retrieval of the byte $c_{33}$, the reproducing arrangement has detected the EOA-word, so that no further bytes are needed for the $Y_3$-DCT block. The byte stored in the $e_{53}$ location is again stored in the surplus memory. The byte $c_{04}$ is retrieved. The byte in the location $e_{14}$ is stored in the surplus memory. This is continued until all the bytes are retried from the $AC_0$ area, and are either allocated to a certain DCT block, or stored in the surplus memory.

Now, the bytes in the surplus memory are exactly the bytes stored in the surplus memory as described previously with reference to FIG. 13b. Those bytes can now be allocated to the DCT blocks. The first byte is the byte $c_{06}$ and thus applied to the $Y_0$-DCT block. Bytes are applied to the $Y_0$ DCT block until the first EOA word in the surplus memory is detected. Next bytes are allocated to the $Y_2$-DCT block until the next EOA word is detected. In this way, all the bytes stored in the surplus memory are allocated to a certain DCT block. As a result, all AC information is retrieved from the second packet portion, so that; in combination with the DC information, also retrieved from the packet portion, the inverse DCT transformation (a data expansion) can be carried out, so as to obtain the replica of the original subpicture.

Next, the situation will be described, such as shown in FIG. 17, where a count values $CV_1$, $CV_2$ and $CV_3$ equal 141, 85 and 98 respectively. The retrieval of the data for the datablock $MB_4$ is in accordance with the description given above, and needs no further explanation. The subpicture corresponding to the datablock $MB_4$ can thus be regenerated.

The reproduction of the information for the datablock $MB_2$ as stored in the packet $P_2$ is in fact also the same as described above, as all the AC information of the datablock $MB_2$ is included in the first 43 bytes of the second packet portion of the packet $P_2$. The reproduction of the datablock $MB_3$ is carried out in an inverse way, compared to the recording of the $MB_1$ datablock described with reference to FIGS. 15 and 16.

FIG. 19 shows that the $MAC_0$ and $LAC_0$ information of the datablock $MB_0$ is retrieved from the first 55 bytes in the second packet portion of the packet $P_1$ in FIG. 17. In the same way, the $MAC_1$ and $LAC_1$ information of the datablock $MB_1$, included in the remaining 54 bytes of that second packet portion, are retrieved. Next, the $LAC_{0s}$ information stored in the packet $P_2$ is retrieved and added to the MAC and LAC information of the datablock $MB_0$, which enables the reproduction arrangement to regenerate the subpicture corresponding to the datablock $MB_0$. Next, the $LAC_{1s}$ information stored in the packets $P_2$ and $P_3$ are retrieved, so as to enable the regeneration of the subpicture corresponding to the datablock $MB_1$.

Figure 20:
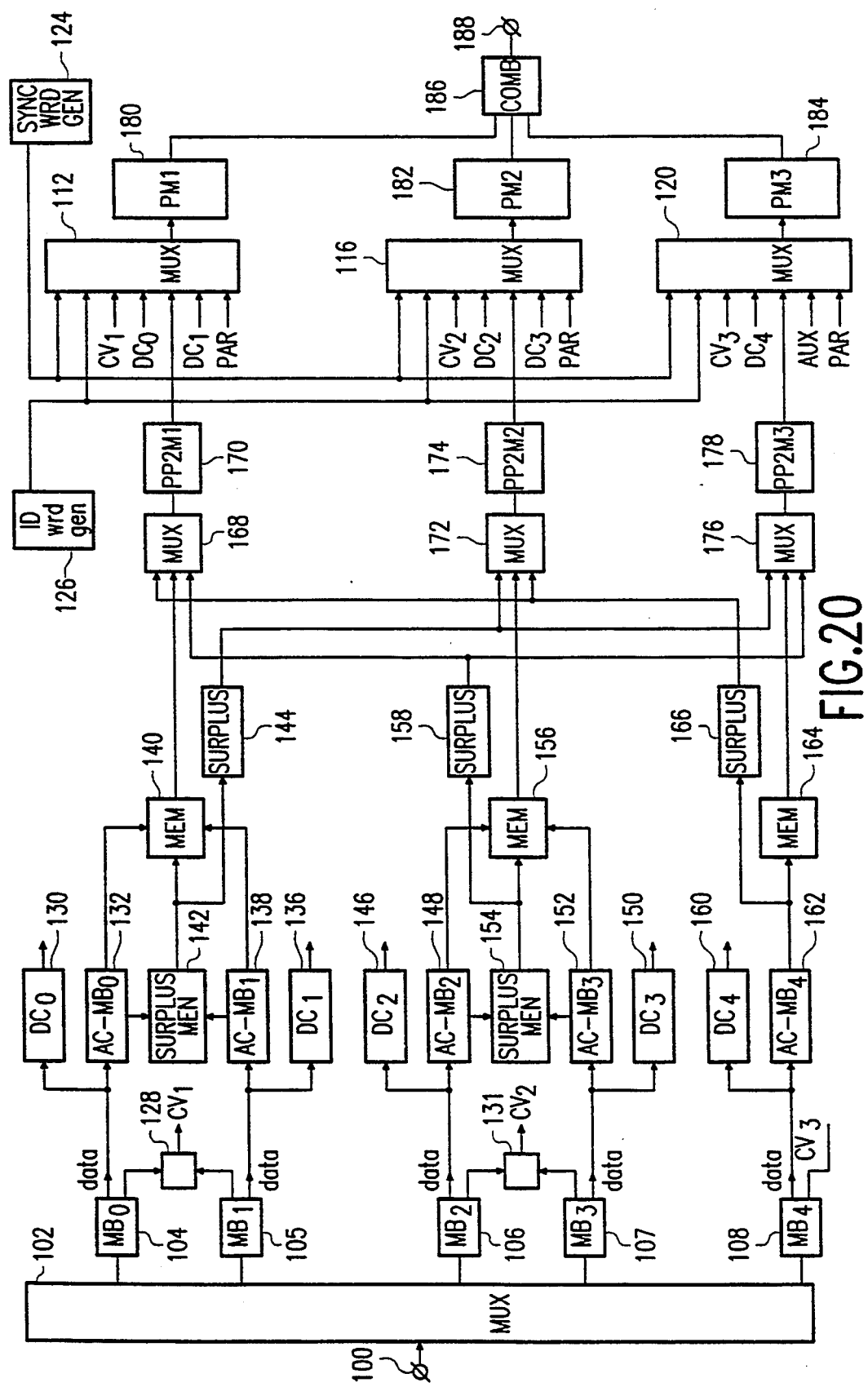
FIG. 20 shows an embodiment of the datareduction unit and the formatting unit in the arrangement of FIG. 1, FIG. 21 including FIG. 21a to FIG. 21b shows a different format for the packets.

FIG. 20 shows an embodiment of the datareduction unit 3 and the formatting unit 4 in the arrangement of FIG. 1. An input 100 for receiving the digital videosignal is coupled to the input of a multiplexer 102. The digital video signal is divided into subpictures by the multiplexer 102, such that the videoinformation corresponding to subpicture $SP_0$ is supplied to a DCT encoder 104, that the videoinformation corresponding to subpicture $SP_1$ is supplied to a DCT encoder 105, that the videoinformation corresponding to subpicture $SP_2$ is supplied to a DCT encoder 106, that the videoinformation corresponding to subpicture $SP_3$ is supplied to a DCT encoder 107, and that the videoinformation corresponding to subpicture $SP_4$ is supplied to a DCT encoder 108. The DCT encoders 104 and 105 carry out a data reduction step on the video information applied to their inputs and supply data reduced video information to inputs 110 and 111 respectively of a circuit block 112. The DCT encoders 106 and 107 carry out a data reduction step on the video information applied to their inputs and supply data reduced video information to inputs 114 and 115 respectively of a circuit block 116. The DCT encoder 108 carries out a data reduction step on the video information applied to its input and supply data reduced video information to an input 118 of a circuit block 120. Further, an auxiliary signal generator 122 is provided which supplies auxiliary data to an input 119 of the circuit block 120.

A sync word generator 124 and an ID word generator 126 are provided for supplying sync words and ID words to the multiplexer circuits 112, 116 and 120. A count value generator 128 is present for generating the count value $CV_1$ from the data reduced information supplied by the DCT encoders 104 and 105. This count value is applied to the multiplexer circuit 112. A count value generator 131 is present for generating the count value $CV_2$ from the data reduced information supplied by the DCT encoders 106 and 107. This count value is applied to the multiplexer circuit 116. A count value $CV_3$ is generated by the DCT encoder 108 and is applied to the multiplexer circuit 120. The count values have the meaning specified above.

The data output of the DCT encoder 104 supplies the DC information and the AC information contained in the datablock $MB_0$. The DC information, that is: the nine bytes of information $DC_0$, see FIG. 6a, is extracted from the output signal of the encoder 104 and stored in a memory 130. The AC information, shown in FIG. 12, is stored in a memory 132. In the same way, the data output of the DCT encoder 105 supplies the DC information and the AC information contained in the datablock $MB_1$. The DC information, that is: the nine bytes of information $DC_1$, see FIG. 6b, is extracted from the output signal of the encoder 105 and stored in a memory 136. The AC information, shown in FIG. 15a, is stored in a memory 138. There is provided a memory 140, a surplus memory 142 and a surplus memory 144.

The data output of the DCT encoder 106 supplies the DC information and the AC information contained in the datablock $MB_2$. The DC information, that is: the nine bytes of information $DC_2$, see FIG. 6a, is extracted from the output signal of the encoder 106 and stored in a memory 146. The AC information of the datablock $MB_2$ is stored in a memory 148. In the same way, the data output of the DCT encoder 107 supplies the DC information and the AC information contained in the datablock $MB_3$. The DC information, that is: the nine bytes of information $DC_3$, see FIG. 6b, is extracted from the output signal of the encoder 107 and stored in a memory 150. The AC information contained in the datablock $MB_3$ is stored in a memory 152. There is provided a memory 156, a surplus memory 154 and a surplus memory 158.

The data output of the DCT encoder 108 supplies the DC information and the AC information contained in the datablock $MB_4$. The DC information, that is: the nine bytes of information $DC_4$ is extracted from the output signal of the encoder 108 and stored in a memory 160. The AC information of the datablock $MB_4$ is stored in a memory 162. There is further provided a memory 164 and a surplus memory 166.

The memories 140, 142 and 144 are adapted to store the AC information of the datablocks $MB_0$ and $MB_1$, in the way as described previously with reference to the FIGS. 12 to 16. In that example, it was assumed that $CV_1$ was equal to 63. That meant that all the AC information of the datablocks $MB_0$ and $MB_1$ can be stored in the second packet portion of one packet. In this situation, the memory 140 is taken 63 bytes large. When storing the AC information of the datablock $MB_0$ in the memory 140, the array of bytes shown in FIG. 14 is stored in the first 32 byte locations of this memory, and the bytes shown in FIG. 13b are stored in the surplus memory 142. Next, the bytes of information shown in FIG. 13b is stored in the empty locations in the first 32 bytes in the memory 140. In the same way, the bytes shown in FIG. 16 are stored in the remaining 31 bytes of the memory 140, and the bytes of information shown in FIG. 15b are stored in the surplus memory 142. Next, the bytes in FIG. 15b, starting with the byte $c_{06}$ are stored in the empty locations in the remaining 31 bytes of the memory 140, until all the empty locations in the remaining 31 bytes are filled. A number of bytes, indicated by $LAC_{15}$ in FIG. 15b, remain in the surplus memory 142. Those bytes are stored in the still remaining empty locations in the first 32 bytes of the memory 140.

In the situation of FIG. 17, $CV_1$ is equal to 141, and the AC information for both datablocks $MB_0$ and $MB_1$ appeared to be larger than 55 bytes. Therefore, it is not possible to store all the AC information of both datablocks in the second packet portion of the first packet alone. The memory 140 is now taken 109 bytes large. The memory 140 is now filled in the way described above. The surplus of AC information of the datablocks $MB_0$ and $MB_1$, in total 32 bytes, which was stored in the surplus memory 142, but can not be stored in the memory 140, is now stored in the surplus memory 144.

As $CV_2$ equals 85, see the example of FIG. 17, the memory 156 is taken 85 bytes large. Moreover, the AC information of datablock $MB_2$ is smaller than 43 bytes, whilst the AC information of the datablock $MB_3$ was larger than 42 bytes. The AC information of the datablock $MB_2$ is stored in the first 43 byte locations of the memory 156. Further, 42 bytes of the AC information of the datablock $MB_3$ is stored in the remaining 42 bytes of the memory 156. The AC information of the datablock $MB_3$ over 42 bytes is stored in the surplus memory 154 and stored thereafter in the remaining empty locations in the first 43 bytes of the memory 156. The surplus memory 158 will thus remain empty.

As $CV_3$ equals 98, the memory 164 is taken equal to 98 bytes large. All AC information of the datablock $MB_4$ can be stored in the memory 164, and the surplus memory 166 remains empty.

It speaks for itself that the surplus memories 142 and 144 can be combined into one surplus memory. In the same way, the surplus memories 154 and 156 can be combined into one surplus memory.

Outputs of the memories 140, 158 and 166 are applied to corresponding inputs of a multiplexer 168, which has an output coupled to an input of a memory 170 for storing the information included in the second packet portion of the first packet $P_1$. Outputs of the memories 144, 156 and 166 are applied to corresponding inputs of a multiplexer 172, which has an output coupled to an input of a memory 174 for storing the information included in the second packet portion of the second packet $P_2$. Outputs of the memories 144, 158 and 164 are applied to corresponding inputs of a multiplexer 176, which has an output coupled to an input of a memory 178 for storing the information included in the second packet portion of the third packet $P_3$. The respective memories 170, 174 and 178 are 109, 109 and 112 bytes large.

Storing the AC information of the five datablocks $MB_0$ to $MB_4$ into the memories 170, 174 and 178 is carried out as follows. Again, we go out from the situation described in FIG. 17. As the memory 140 is 109 bytes large and is completely filled with AC information of the datablocks, the multiplexer 168 multiplexes the output of the memory 140 to the input of the memory 170, so that the contents of the memory 140 is loaded in the memory 170.

The memory 156 is 85 bytes large. The multiplexer 172 now multiplexes the output of the memory 156 to the input of the memory 116, so that the first 43 bytes of information stored in the memory 156 can be stored in the memory 174. Next, the multiplexer 172 multiplexes the output of the memory 144 to the input of the memory 174, so that the first 24 bytes of the surplus information stored in the memory 144 can be stored in the next 24 bytes of the memory 174. The multiplexer 172 now multiplexes the output of the memory 156 to the input of the memory 174, so that the last 42 bytes of information stored in the memory 156 are loaded in the memory 174.

The memory 164 is 98 bytes large. The multiplexer 176 multiplexes the output of the memory 164 to the input of the memory 178, so that the 98 bytes of information stored in the memory 164 can be stored in the memory 178. Next, the multiplexer 176 multiplexes the output of the memory 144 to the input of the memory 178, so that the remaining 8 bytes of the surplus information stored in the memory 144 can be stored in the next 8 bytes of the memory 178.

Outputs of the memories 170, 174 and 178 are coupled to an input of a corresponding multiplexer 112, 116 and 120 respectively. The multiplexer 112 further receives, apart from the already mentioned sync word and ID word, the count value $CV_1$, the $DC_0$ and $DC_1$ information of the datablocks $MB_0$ and $MB_1$ and parity information. The multiplexer 116 further receives, the count value $CV_2$, the $DC_2$ and $DC_3$ information of the datablocks $MB_2$ and $MB_3$ and parity information. The multiplexer 120 further receives, the count value $CV_3$, the $DC_4$ information of the datablock $MB_4$, the auxiliary information and parity information.

The multiplexers 112, 16 and 120 subsequently switch all their inputs, starting with the top input and further down towards their lowest input, to their outputs, which outputs are coupled to an input of a corresponding packet memory 180, 182 and 184 respectively. The packet memories are 141 bytes large and store the information selected by the multiplexers, so that the information content of FIG. 5 is obtained.

Outputs of the memories 180, 182 and 184 are coupled to a combination unit 186, which has an output coupled to the output 188. The output 188 corresponds to the output of the formatting unit 4 in FIG. 1. The serial datastream of the three packets $P_1$, $P_2$ and $P_3$ is now available at the output 188 for recording on the record carrier.

The above encoding step is repeated for the next five subpictures of the picture.

FIG. 21 shows a slightly different format of the packets, compared to the format of the packets shown in FIG. 5. In this new format, scale factor information corresponding to each datablock are also stored in the second packet portion of the packets. This is shown in FIG. 21a for a first packet $P_1$. Scalefactor information $SF_0$ for the datablock $MB_0$ is included between the DC information and the AC information of the datablock $MB_0$, and scalefactor information $SF_1$ for the datablock $MB_1$ is included between the DC information and the AC information of the datablock $MB_1$.

The use of the scalefactor will now be explained briefly. It is known in the art that groups of datablocks can be compressed into a fixed number of bits. In the publication 'An intraframe feedforward coding system' by P. H. N. de With et al in Proc. 12th Benelux Symposium on Information Theory, ISBN 90-71048-07-1, pp. 63-9, Veldhoven (NL), May 1991, a system is described in which a group of datablocks is first analyzed with several quantization strategies in parallel before the final coding takes place. Then one quantizer strategy is selected, i.e. the strategy that yields the desired bitrate after compression. The number of the adopted quantizer (strategy) needs to be transmitted in the coded datastream, so that at the decoder side the correct inverse quantization is applied. In the description of the invention, we have termed the applied quantizer strategy for compression the (quantizer) scale factor. Since the invention is based on separate or independent processing of the two datablocks in a datapacket, it can be understood that the scale factor is recorded for each datapacket independently and thus separately.

The format of the second packet $P_2$ is identical to the format of figure 21a. FIG. 21b shows the format for the third packet $P_3$, and includes the scalefactor information $SF_4$ for the datablock $MB_4$, which is included between the DC information and the AC information of the said datablock.

FIG. 22 shows an embodiment of a reproduction arrangement for reproducing the videoinformation recorded on a record carrier by means of the recording arrangement described above. The reproducing arrangement comprises reproducing means 200 for reading a signal from the tracks on the record carrier, an output of which is coupled to an input of a channel decoder 202. The channel decoder realizes a decoding on the signal read from the track which is inverse to the channel encoding carried out by the encoder 5 of FIG. 1. The output signal of the channel decoder 202 is in the form of a serial datastream of the packets described above. An output of the decoder 202 is coupled to an input of deformatting means 204. The deformatting means 204 are adapted to retrieve datablocks of information included in said plurality of packets, that is: the information of the datablocks $MB_0$ and $MB_1$ from a first packet, the information of the datablocks $MB_2$ and $MB_3$ from a second packet and the information of the datablock $MB_4$ from a third packet. Each datablock comprises datareduced videoinformation, which defines a subpicture of a plurality of subpictures in which a picture is divided. An output of the deformatting means 204 is coupled to an input of data expansion means 206 for expanding the data reduced videoinformation included in the datablocks, so as to obtain a replica of the original digital videosignal. The digital videosignal is applied to a D/A converter 208 so as to obtain an analog version of the replica of the digital videosignal.

More specifically, the deformatting means 204 comprise a count value detector unit (not shown) so as to retrieve the count value $CV_i$ stored in the second packet portion of a packet. Further, scale factor detector means (not shown) may be provided to retrieve the scale factor information from the second packet portions of the packets.

We claim:

1. An arrangement for recording, at a predetermined recording speed, a digital videosignal in a track on a record carrier, the recording arrangement comprising an input terminal for receiving the digital videosignal, data compression means for compressing the digital videosignal so as to obtain compressed videoinformation in the form of a plurality of datablocks, each datablock defining a subpicture of a plurality of subpictures into which a picture is divided, first and second datablocks each comprising a number respective of n DC coefficients, where n is an integer and $n \geq 1$, a plurality of respective most significant AC coefficients and a plurality of respective least significant AC coefficients, formatting means for formatting said first and second datablocks into a plurality of packets for recording in said track, a first packet comprising a first packet portion comprising a synchronisation word and an identification word and a second packet portion, recording means for recording the plurality of packets in a track on the record carrier, wherein said formatting means are adapted to store compressed videoinformation included in said first and second datablocks in the second packet portion of said first packet, such that the n DC coefficients of the first datablock are stored first, the plurality of most significant AC coefficients of the first datablock are stored next, the n DC coefficients of the second datablock are stored last in the second packet portion, and the plurality of most significant AC coefficients of the second datablock are stored before the n DC coefficients of the second datablock in the second packet portion.

2. An arrangement as claimed in claim 1, wherein the formatting means are further adapted to store the compressed videoinformation included in third and fourth datablocks in the second packet portion of a second packet, such that the n DC coefficients of the third datablock are stored first, the plurality of most significant AC coefficients of the third datablock are stored next, the n DC coefficients of the fourth datablock are stored last in the second packet portion of said second packet, and the plurality of most significant AC coefficients of the fourth datablock are stored before the n DC coefficients of the fourth datablock in the second packet portion of said second packet.

3. An arrangement as claimed in claim 1, the formatting means also being adapted to include an auxiliary signal in said plurality of packets, said formatting means being adapted to store the compressed videoinformation included in a fifth datablock and said auxiliary signal in the second packet portion of a third packet, such that the n DC coefficients of the fifth datablock are stored first, the plurality of most significant AC coefficients of the fifth datablock are stored next, and the auxiliary signal information is stored last in the second packet portion of said third packet.

4. An arrangement as claimed in claim 1, wherein the formatting means is also adapted to include an auxiliary signal in said plurality of packets said formatting means being adapted to store the information included in a fifth datablock and auxiliary signal information in the second packet portion of a third packet, such that the auxiliary signal information is stored first, the n DC coefficients of the fifth datablock are stored last, in the second packet portion, and the plurality of most significant AC coefficients of the fifth datablock are stored before the n DC coefficients of the fifth datablock in the second packet portion.

5. An arrangement as claimed in claim 1, wherein it further comprises count value generating means for generating a count value corresponding to a number of bytes needed to represent the AC coefficients of the datablocks included in the second packet portion.

6. An arrangement as claimed in claim 5, wherein the count value generating means is adapted to generate for the i-th packet, a count value $CV_i$, corresponding to a number of bytes needed to represent the AC coefficients of the $(2i-1)$-th and $(2i)$-th datablock, the formatting means further being adapted to store the count value $CV_i$ in the second packet portion of the i-th packet, where i is 1 or 2.

7. An arrangement as claimed in claim 6, characterized in that, if the count value $CV_i$ is smaller than or equal to the number of bytes $N_i$ available in a first part of the second packet portion of the i-th packet located between the DC coefficients of the $(2i-1)$-th and $(2i)$-th datablock stored in said second packet portion, the formatting means are further adapted to store least significant AC coefficients of the $(2i-1)$-th datablock after the most significant AC coefficients of the $(2i-1)$-th datablock in said first part of said second packet portion and least significant AC coefficients of the $(2i)$-th datablock are stored before the most significant coefficients of the $(2i)$-th datablock in said part of said second packet portion.

8. An arrangement as claimed in claim 7, wherein if $CV_i$ is smaller than $N_i$, the formatting means are further adapted to store least significant AC coefficients of a j-th datablock in the remaining part of the second packet portion between the least significant coefficients of the $(2i-1)$-th and $(2i)$-th datablock, where j equals one of the integers 1 to 5 and is unequal to $(2i-1)$ and $(2i)$.

9. An arrangement as claimed in claim 6, wherein the count value generating means are further adapted to generate a count value $CV_3$ corresponding to the number of bytes needed to represent the AC coefficients of the fifth datablock, the formatting means further being adapted to store the count value $CV_3$ in the second packet portion of the third packet of the fifth datablock.

10. An arrangement as claimed in claim 9, wherein if the count value $CV_3$ is smaller than or equal to the number of bytes $N_3$ available in that part of the second packet portion of the third packet located between the DC coefficients of the fifth datablock and the auxiliary information stored in said second packet portion, the formatting means are further adapted to store the least significant AC coefficients of the fifth datablock after the most significant AC coefficients of the fifth datablock in said part of said second packet portion.

11. An arrangement as claimed in claim 10, wherein if $CV_3$ is smaller than $N_3$, the formatting means are further adapted to store least significant AC coefficients of a j-th datablock in the remaining part of the second packet portion between the least significant coefficients of the fifth datablock and the auxiliary information, where j equals one of the integers 1 to 4.

12. An arrangement as claimed in claim 1, further comprising scale factor generating means for generating a scale factor for the AC coefficients of each of the datablocks, wherein the formatting means are further adapted to store the scale factor for the (2i−1)-th datablock between the DC coefficients and the most significant AC coefficients of the (2i−1)-th datablock in the second packet portion of the i-th packet, and are further adapted to store the scale factor for the (2i)-th datablock between the DC coefficients and the most significant AC coefficients of the (2i)-th datablock in the second packet portion of the i-th packet, where i is 1 or 2.

13. An arrangement as claimed in claim 12, wherein the formating means are further adapted to store the scale factor for the fifth datablock between the DC coefficients and the most significant AC coefficients of the fifth datablock in the second packet portion of the third packet.

14. An arrangement as claimed in claim 1 or 2, wherein the DC coefficients and most significant AC coefficients of the (2i)-th datablock are stored in the second packet portion of the i-th packet in a reverse order compared to the order in which the DC and most significant AC coefficients of the (2i−1)-th datablock are stored in the second packet portion of the i-th packet, where i is 1 or 2.

15. Record carrier obtained with the arrangement as claimed in claim.

16. An arrangement for reproducing a digital videosignal from a track on a record carrier, the reproducing arrangement comprising reproducing means for reading a signal comprising a plurality of packets recorded in a track on the record carrier, deformatting means for retrieving datablocks of information included in said plurality of packets, each packet comprising a first packet portion comprising a synchronisation word and an identification word, a second packet portion comprising compressed videoinformation, each datablock defining a subpicture of a plurality of subpictures in which a picture is divided, first and second datablocks each, comprising a number of n DC coefficients, a plurality of most significant AC coefficients and a plurality of least significant AC coefficients, where n is an integer and $n \geq 1$, data expansion means for expanding compressed videoinformation included in said plurality of datablocks, so as to obtain a replica of the original digital videosignal, an output terminal for supplying the replica of the digital videosignal, wherein, the deformatting means are adapted to retrieve the identification word from the first packet portion, to retrieve the compressed videoinformation corresponding to said first and second datablocks from the second packet portion of said first packet, so as to obtain the n DC coefficients of the first datablock which are stored first in said second packet portion, so as to obtain the plurality of most significant AC coefficients of the first datablock which are stored next in said second packet portion, so as to obtain the plurality of most significant AC coefficients of the first datablock which are stored next in said second packet portion, so as to obtain the n DC coefficients of the second datablock which are stored last in the second packet portion, and so as to obtain the plurality of most significant AC coefficients of the second datablock which are stored before the n DC coefficients of the second datablock in the second packet portion.

17. Arrangement as claimed in claim 16, wherein the deformatting means are further adapted to retrieve a count value $CV_i$ stored in a packet, the count value corresponding to the number of bytes needed to represent the AC coefficients of the datablocks included in the second packet portion of said first packet.

18. Arrangement as claimed in claim 17, wherein the deformatting means are adapted to differentiate, in response to a count value retrieved from a packet, between AC coefficients of datablocks having their DC and AC coefficients stored in the second packet portion of said first packet and AC coefficients originating from datablocks having their DC coefficients stored in one or more of the other packets.

* * * * *